US009423528B2

(12) United States Patent
Alli et al.

(10) Patent No.: US 9,423,528 B2
(45) Date of Patent: Aug. 23, 2016

(54) METHOD OF MAKING SILICONE CONTAINING CONTACT LENS WITH REDUCED AMOUNT OF DILUENTS

(71) Applicant: Johnson & Johnson Vision Care, Inc., Jacksonville, FL (US)

(72) Inventors: Azaam Alli, Jacksonville, FL (US); Shivkumar Mahadevan, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 209 days.

(21) Appl. No.: 13/915,126

(22) Filed: Jun. 11, 2013

(65) Prior Publication Data

US 2013/0345364 A1    Dec. 26, 2013

Related U.S. Application Data

(60) Provisional application No. 61/663,719, filed on Jun. 25, 2012.

(51) Int. Cl.
*G02B 1/04* (2006.01)

(52) U.S. Cl.
CPC ................................ *G02B 1/043* (2013.01)

(58) Field of Classification Search
CPC ...... G02B 1/043; C08F 30/08; C08F 230/08; C08F 2230/065; C08F 16/12; C08F 16/26; C08F 216/1416; C08F 2216/1425; C08F 2216/1433
USPC ........ 526/279, 319, 320, 332; 525/185, 474, 525/479; 351/159.01, 159.02
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,113,224 A | 9/1978 | Clark | |
| 4,136,250 A | 1/1979 | Mueller | |
| 4,139,513 A | 2/1979 | Tanaka | |
| 4,139,692 A | 2/1979 | Tanaka | |
| 4,197,266 A | 4/1980 | Clark | |
| 4,259,467 A | 3/1981 | Keogh | |
| 4,851,216 A | 7/1989 | Lee | |
| 4,910,277 A | 3/1990 | Bambury | |
| 5,070,215 A | 12/1991 | Bambury | |
| 5,314,960 A | 5/1994 | Spinelli | |
| 5,371,147 A | 12/1994 | Spinelli | |
| 5,484,863 A * | 1/1996 | Molock et al. ............... 526/301 |
| 5,998,498 A | 12/1999 | Vanderlaan | |
| 6,020,445 A | 2/2000 | Vanderlaan | |
| 6,367,929 B1 | 4/2002 | Maiden | |
| 6,822,016 B2 | 11/2004 | McCabe | |
| 6,867,245 B2 | 3/2005 | Iwata | |
| 6,943,203 B2 | 9/2005 | Vanderlaan | |
| 7,249,848 B2 | 7/2007 | Laredo | |
| 7,431,152 B2 | 10/2008 | Marmo | |
| 7,691,916 B2 | 4/2010 | McCabe | |
| 7,786,185 B2 | 8/2010 | Rathore | |
| 7,816,455 B2 | 10/2010 | Marmo | |
| 8,011,784 B2 | 9/2011 | Liu | |
| 8,071,704 B2 | 12/2011 | Lang | |
| 8,168,720 B2 | 5/2012 | McCabe et al. | |
| 2004/0192872 A1 | 9/2004 | Iwata | |
| 2008/0128930 A1 | 6/2008 | Lai | |
| 2010/0133710 A1* | 6/2010 | McCabe et al. ............. 264/1.36 |
| 2010/0280146 A1 | 11/2010 | Vanderlaan | |

FOREIGN PATENT DOCUMENTS

| | | |
|---|---|---|
| EP | 1128191 B1 | 4/2005 |
| EP | 1818692 A2 | 8/2007 |
| WO | WO 9631792 A1 | 10/1996 |
| WO | WO 03022321 A2 | 3/2003 |
| WO | WO 03022322 A2 | 3/2003 |

OTHER PUBLICATIONS

PCT International Search Report, dated Sep. 4, 2013, for PCT Int'l Appln. No. PCT/US2013/045774.
ISO 18369-4:2006(E): Ophthalmic optics—Contact lenses—Part 4: Physicochemical properties of contact lens materials.
Crivello et al, vol. III, Photoinitiators for Free Radical Cationic & Anionic Photopolymerization, 2nd Edition; edited by G. Bradley; John Wiley and Sons; New York; 1998.

* cited by examiner

*Primary Examiner* — Irina S Zemel
*Assistant Examiner* — Jeffrey Lenihan

(57) ABSTRACT

The present invention relates to a method of manufacturing a contact lens including the steps of: (i) adding reactive components to a mold, wherein the reactive components comprise (a) at least one hydroxy-containing silicone component having a weight average molecular weight from about 200 to about 15,000 g/mole and (b) at least one mono-ether terminated, mono-methacrylate terminated polyethylene glycol having a weight average molecular weight from about 200 to about 10,000 g/mole; (ii) curing the reactive components within the mold to form the contact lens; and (iii) removing the contact lens from said mold.

21 Claims, No Drawings

METHOD OF MAKING SILICONE CONTAINING CONTACT LENS WITH REDUCED AMOUNT OF DILUENTS

RELATED APPLICATIONS

This application claims priority to U.S. Provisional Patent Application No. 61/663,719, filed on Jun. 25, 2012 entitled METHOD OF MAKING SILICONE CONTAINING CONTACT LENS WITH REDUCED AMOUNT OF DILUENTS, the contents of which are incorporated by reference.

FIELD OF THE INVENTION

The present invention relates to the method of making silicone containing contact lens.

BACKGROUND OF THE INVENTION

Contact lenses have been used commercially to improve vision since the 1950s. The first contact lenses were made of hard materials. Although these lenses are still currently used, they are not suitable for all patients due to their poor initial comfort and their relatively low permeability to oxygen. Later developments in the field gave rise to soft contact lenses, based upon hydrogels, which are extremely popular today. Many users find soft lenses are more comfortable, and increased comfort levels can allow soft contact lens users to wear their lenses longer than users of hard contact lenses.

It is desirable to manufacture silicone-containing contact lens using reduced or no diluent systems, which can enable the cured polymer to be "dry released" from the mold parts, placed directly into the final package containing packing solution for equilibration. Typically, the zero diluent systems containing high levels of PVP tend to produce cured lenses that are very brittle. These lenses when released using mechanical force are susceptible to physical damage. Applicants have found the incorporation of at least one mono-ether terminated, mono-methacrylate terminated polyethylene glycol significantly lowers the level of brittleness in the cured lenses. Thus, the cured lenses are less liable to fracture when subjected to stress during the lens release process. The at least one mono-ether terminated, mono-methacrylate terminated polyethylene glycol also allows for tuning the visco-elastic properties of the cured polymers for desirable mechanical lens release without the use of liquids.

SUMMARY OF THE INVENTION

In one aspect, the present invention relates to a method of manufacturing a contact lens, said method comprising the steps of:
(i) adding reactive components to form a reactive mixture, wherein said reactive components comprise (a) at least one hydroxy-containing silicone component having a weight average molecular weight from about 200 to about 15,000 g/mole and (b) at least one monofunctional polyethylene glycol having a weight average molecular weight from about 200 to about 10,000 g/mole; and less than about 15 wt % diluents;
(ii) curing said reactive components within said mold to form said contact lens comprising a polymer having a Tg (heating) of less than about 125 C; and
(iii) dry removing said contact lens from said mold.

In another aspect, the present invention feature a contact lens manufactured according to the above method.

Other features and advantages of the present invention will be apparent from the detailed description of the invention and from the claims.

DETAILED DESCRIPTION OF THE INVENTION

It is believed that one skilled in the art can, based upon the description herein, utilize the present invention to its fullest extent. The following specific embodiments can be construed as merely illustrative, and not limitative of the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

DEFINITIONS

As used herein "reactive mixture" refers to the mixture of components (both reactive and non-reactive) which are mixed together and subjected to polymerization conditions to form the silicone hydrogels and contact lenses of the present invention. The reactive mixture comprises reactive components such as monomers, macromers, prepolymers, cross-linkers, and initiators, and additives such as wetting agents, release agents, dyes, pigments, light absorbing compounds such as UV absorbers and photochromic compounds, any of which may be reactive or non-reactive but are capable of being retained within the resulting lens, as well as pharmaceutical and neutriceutical compounds, and any diluents. It will be appreciated that a wide range of additives may be added based upon the lens which is made, and its intended use.

Concentrations of components of the reactive mixture are given in weight % of all components in the reaction mixture, excluding any diluents. When diluents are used their concentrations are given as weight % based upon the amount of all components in the reaction mixture and the diluents.

As used herein "reactive groups" are groups that can undergo free radical and/or tionic polymerization.

As used herein, "polymerizable" means that the compound comprises at least one polymerizable functional group, such as acrylate, methacrylate, acrylamide, methacrylamide, N-vinyl lactam, N-vinylamide, and styryl functional groups. "Nonpolymerizable" means that the compound does not comprise such a polymerizable functional group.

As used herein, "hydrophobic" means that the compound(s)/monomer(s) is insoluble in a mixture of 10 weight parts in 90 weight parts of water, and "hydrophilic" means that the compound(s)/monomer(s) is soluble in a mixture of 10 parts in 90 weight parts of water. The solubility of a substance is evaluated at 20° C.

As used herein, the term "alkyl" refers to a hydrocarbon group of from 1 to 20 carbons, unless otherwise indicated.

Silicone Component

The reactive mixture contains at least one silicone-containing component comprising at least one hydroxy group ("hydroxy-containing silicone component") and having a weight average molecular weight from about 200 to about 15,000 g/mole, such as from about 300 to about 2,000 g/mole. A silicone-containing component (or silicone component) is one that contains at least one [—Si—O—Si] group, in a monomer, macromer or prepolymer. In one embodiment, the Si and attached O are present in the silicone-containing component in an amount greater than 20 weight percent, such as greater than 30 weight percent of the total molecular weight of the silicone-containing component. Useful hydroxy-containing silicone components include polymerizable functional groups such as acrylate, methacrylate, acrylamide, methacrylamide, N-vinyl lactam, N-vinylamide, and styryl functional groups. Examples of hydroxy-containing silicone components which are useful in this invention may be found in U.S. Pat. Nos. 4,139,513; 4,139,692; 5,998,498; and 5,070,215.

Suitable hydroxyl-containing silicone components include compounds of Formula I

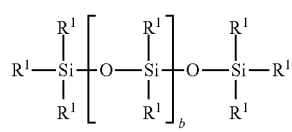

Formula I wherein:

$R^1$ is independently selected from reactive groups, alkyl groups, or aryl groups, any of the foregoing which may further comprise functionality selected from hydroxy, amino, oxa, carboxy, alkyl carboxy, alkoxy, amido, carbamate, carbonate, halogen or combinations thereof; and siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500 (such as 0 to 100, such as 0 to 20), where it is understood that when b is other than 0, b is a distribution having a mode equal to a stated value; and wherein at least one $R^1$ comprises a reactive group, and in some embodiments from one to three $R^1$ comprise reactive groups and at least one R group comprises one or more hydroxyl group.

Non-limiting examples of radical reactive groups include (meth)acrylates, styryls, vinyls, vinyl ethers, $C_{1-6}$alkyl (meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

In one embodiment b is zero, one $R^1$ is a reactive group, and at least 3 $R^1$ are selected from monovalent alkyl groups having one to 16 carbon atoms, and in another embodiment from monovalent alkyl groups having one to 6 carbon atoms, in another embodiment one $R^1$ is a reactive group, two $R^1$ are trialkyl siloxanyl group and the remaining $R^1$ are methyl, ethyl or phenyl and in a further embodiment one $R^1$ is a reactive group, two $R^1$ are trialkyl siloxanyl groups and the remaining $R^1$ are methyl. Non-limiting examples of silicone components of this embodiment include propenoic acid,-2-methyl-,2-hydroxy-3-[3-[1,3,3,3-tetramethyl-1-[(trimethylsilyl)oxy]-1-disiloxanyl]propoxy]propyl ester ("SiGMA"; structure in Formula II),

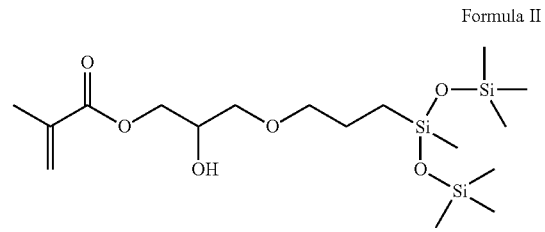 [SMILES: C=C(C)C(=O)OCC(O)COCCC[Si](C)(O[Si](C)(C)C)O[Si](C)(C)C]

Formula II and 2-hydroxy-3-methacryloxypropyloxypropyl-tris(trimethylsiloxy)silane.

In another embodiment, b is 2 to 20, 3 to 20, 3-16, 3 to 15 or in some embodiments 3 to 10; at least one terminal $R^1$ comprises a reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-2000, or 400-1600 $M_w$) ("OH-mPDMS"; structure in Formula III).

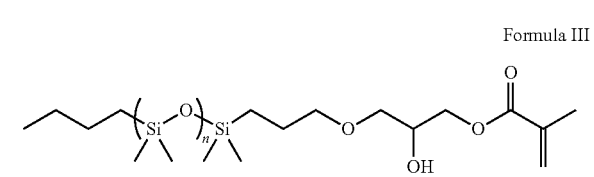

Formula III

In one embodiment a mixture of hydroxyl-containing silicone components may be used to improve the compatibility of the reactive mixture.

In another embodiment, the hydroxyl-containing silicone component comprises a polydimethylsiloxane bis-methacrylate with pendent hydroxyl groups, such as compound C2, C4 or R2 described in US Patent Application No. 2004/0192872 or such as is described in Examples XXV, XVIII, or XXXii in U.S. Pat. No. 4,259,467, polymerizable polysiloxanes with pendant hydrophilic groups such as those disclosed in U.S. Pat. No. 6,867,245. In some embodiments the pendant hydrophilic groups are hydroxyalkyl groups and polyalkylene ether groups or combinations thereof. The polymerizable polysiloxanes may also comprise fluorocarbon groups. An example is shown as structure B3.

Other silicone components suitable for use in this invention include those described as "C" Materials in WO 96/31792. Another class of suitable silicone-containing components includes silicone containing macromers made via GTP, such as the hydroxyl-containing macromers disclosed in U.S. Pat. Nos. 5,314,960, 5,371,147 and 6,367,929.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In one embodiment, the silicone component is selected from the group consisting of bis-3-acryloxy-2-hydroxypropyloxypropyl polydialkylsiloxane; mono-(3-methacryloxy-2-hydroxypropyloxy)propyl terminated, mono-alkyl terminated polydialkylsiloxane; and mixtures thereof In one embodiment, the silicone component is selected from bis-3-acryloxy-2-hydroxypropyloxypropyl polydialkylsiloxane; and mono-(3-methacryloxy-2-hydroxypropyloxy)propyl terminated, mono-butyl terminated polydialkylsiloxane; and mixtures thereof.

Examples of other silicone components include the following:

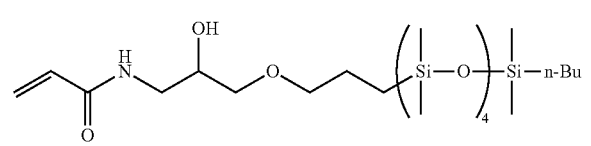

Formula IV

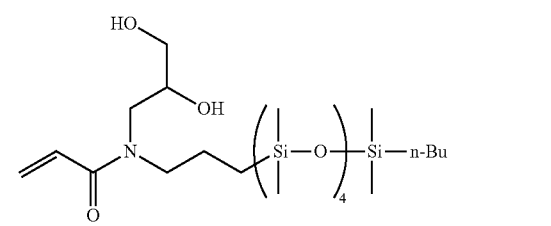

Formula V

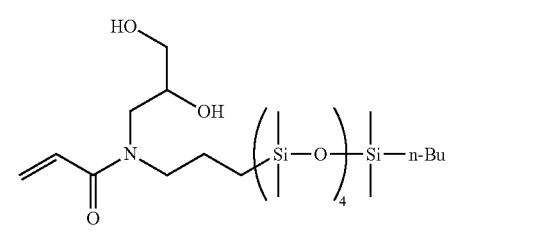

Formula VI

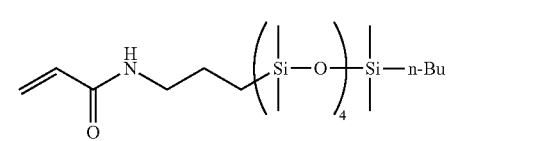

Formula VII

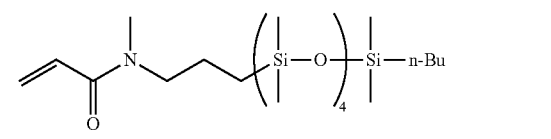

Formula VIII

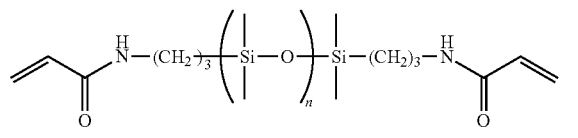

Formula IX

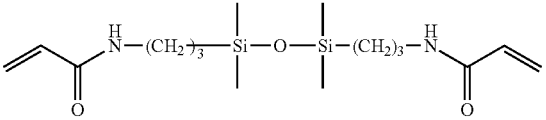

Formula X

In one embodiment, the silicone component has an average molecular weight of from about 400 to about 4000 daltons.

The silicone containing component(s) may be present in amounts from about 10 to about 87 weight %, and in some embodiments from about 10 and about 80 and in other embodiments from about 20 and about 70 weight %, based upon all reactive components of the reactive mixture (e.g., excluding diluents).

Monofunctional Terminated Polyethylene Glycol

The reactive mixture also contains at least one monofunctional polyethylene glycol having a weight average molecular weight from about 200 to about 10,000 g/mole, such as from about 200 to about 2,000 g/mole. The monofunctional polyethylene glycol comprises only one polymerizable group and may be a mono-ether terminated, mono-(meth) acrylate or (meth)acrylamide terminated polyethylene glycol. Examples of mono-ether terminal groups include, but are not limited to, C1-C6 alkoxy groups, such as methoxy and ethoxy or alkoxy groups comprising up to 8 carbons. Examples of such mono-ether terminated, mono-methacrylate terminated polyethylene glycol include, but are not limited to, mPEG 475 (polyethyleneglycol (475 Mw) monomethylether monomethacrylate, available from Sigma-Aldrich, St. Louis, Mo. USA ("mPEG475").

The monofunctional polyethylene glycol(s) may be present in amounts from about 3 and about 30 weight %, from about 5 to about 30 weight %, and in other embodiments from about 10 and about 30 weight %, based upon all reactive components of the reactive mixture (e.g., excluding diluents if any).

The monofunctional polyethylene glycol(s) provide the resulting cured, prehydrated polymers with glass transition temperature upon heating, Tg, of less than about 125 C, or between about 115 and about 125 C. This provides desirable dry release characteristics, and particularly a resistance to fracturing. The properties of the hydrated lens are substantially unchanged from reactive mixtures which do not comprise at least one monofunctional polyethylene glycol.

Other Hydrophilic Components

In one embodiment, the reactive mixture/lens may also include at least one other hydrophilic component. In one embodiment, these hydrophilic components can be any of the hydrophilic monomers known to be useful to make hydrogels.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term "vinyl-type" or "vinyl-containing" monomers refer to monomers containing the vinyl grouping ($Y-CH=CH_2$) and that are capable of polymerizing, where Y is not a carbonyl ($C=O$) group.

Hydrophilic vinyl-containing monomers which may be incorporated into the reactive mixtures/hydrogels/lenses of the present invention include, but are not limited to, monomers such as N-vinyl amides, N-vinyl lactams (e.g. N-vinylpyrrolidone or NVP), N-vinyl-N-methyl acetamide, N-vinyl-N-ethyl acetamide, N-vinyl-N-ethyl formamide, N-vinyl formamide, with NVP being preferred.

"Acrylic-type" or "acrylic-containing" monomers are those monomers containing the acrylic group: ($CH_2$=CRCOX) wherein R is H or $CH_3$, and X is O or N, which are also known to polymerize readily, such as N,N-dimethyl acrylamide (DMA), acrylamide, 2-hydroxyethyl methacrylate (HEMA), glycerol methacrylate, 2-hydroxyethyl methacrylamide, polyethyleneglycol monomethacrylate, methacrylic acid, mixtures thereof and the like.

Other hydrophilic monomers that can be employed in the invention include, but are not limited to, polyoxyethylene alcohols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene alcohol through linking moieties such as carbamate or ester groups.

Still further examples are the hydrophilic vinyl carbonate or vinyl carbamate monomers disclosed in U.S. Pat. No. 5,070,215 and the hydrophilic oxazolone monomers disclosed in U.S. Pat. No. 4,910,277. Other suitable hydrophilic monomers will be apparent to one skilled in the art.

In one embodiment the other hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the other hydrophilic monomers comprise at least one of DMA, HEMA, NVP and N-vinyl-N-methyl acrylamide and mixtures thereof. In another embodiment, the other hydrophilic monomer comprises DMA and/or HEMA.

The other hydrophilic component(s) (e.g., DMA or HEMA) may be present in a wide range of amounts, depending upon the specific balance of properties desired. In one embodiment, the amount of the hydrophilic component is up to about 60 weight %, such as from about 5 and about 40 weight %, from about 10 to about 40 weight %, from about 13 to about 40 weight %, or from about 13 to about 30 weight %, based upon the weight of the reactive components. In one embodiment, the weight ratio of (i) said hydrophilic components (e.g., DMA or HEMA) and (ii) said at least one at least one mono-methacrylate terminated polyethylene glycol is from about 25:75 to about 75:25.

In another embodiment the amount of (meth)acrylamide monomers is less than about 10 weight % or between about 3 and about 10 weight % of all components in the reaction mixture, excluding any diluents. Examples of (meth)acrylamide monomers include, DMA, acrylamide, N-vinyl-N-methyl acrylamide, N-vinylacrylamide, mixtures thereof and the like.

The amount of hydroxyl alkyl monomers, may be between about 10 and about 20 weight % of all components in the reaction mixture, excluding any diluents. Examples of hydroxyl alkyl monomers include HEMA, 2-hydroxyethyl acrylate, 2-hydroxyethyl methacrylamide, 2-hydroxypropyl methacrylamide, 2-hydroxypropyl methacrylate, 2-hydroxybutyl methacrylamide, 2-hydroxybutyl methacrylate, mixtures thereof and the like, Polymerization Initiator One or more polymerization initiators may be included in the reaction mixture. Examples of polymerization initiators include, but are not limited to, compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (IRGACURE® 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include, but are not limited to, IRGACURE® 819, IRGACURE®1700, IRGACURE®1800, IRGACURE®1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998.

The polymerization initiator is used in the reaction mixture in effective amounts to initiate photopolymerization of the reaction mixture, such as from about 0.1 to about 2 weight %. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (IRGACURE® 819) or a combination of 1-hydroxycyclohexyl phenyl ketone and DMBAPO, and in another embodiment the method of polymerization initiation is via visible light activation.

Internal Wetting Agent

In one embodiment, the reaction mixture includes one or more internal wetting agents. Internal wetting agents may include, but are not limited to, high molecular weight, hydrophilic polymers such as those described in U.S. Pat. Nos. 6,367,929; 6,822,016; 7786185; PCT Patent Application Nos. WO03/22321 and WO03/22322, or reactive, hydrophilic polymers such as those described in U.S. Pat. No. 7,249,848. Examples of internal wetting agents include, but are not limited to, polyamides such as poly(N-vinyl pyrrolidone), poly(dimethyl acrylamide) and poly (N-vinyl-N-methyl acetamide), polyN-vinyl acetamide, polyacrylamide and copolymers thereof. Suitable comonomers include acrylic acid, methacrylic acid, 2-hydroxyethyl methacrylate, reactive polyethylene glycol monomers, combinations thereof and the like.

The internal wetting agent(s) may be present in a wide range of amounts, depending upon the specific parameter desired. In one embodiment, the amount of the wetting agent(s) is up to about 50 weight %, up to about 30 weight %, such as from about 5 and about 40 weight %, from about 5 and about 30 weight %, such as from about 6 to about 40 weight % or from about 6 to about 25 weight % based upon all % of all components in the reaction mixture, excluding any diluents.

Other Components

Other components that can be present in the reaction mixture used to form the contact lenses of this invention include, but are not limited to, ultra-violet absorbing compounds, medicinal agents, antimicrobial compounds, copolymerizable and nonpolymerizable dyes, copolymerizable and non-copolymerizable photochromic compounds, ionic monomers or components, surfactants, release agents, reactive tints, pigments, combinations thereof and the like. In one embodiment, the sum of additional components may be up to about 20 wt %.

Diluents

In one embodiment, the reactive components (e.g., silicone-containing components, hydrophilic monomers, wetting agents, and/or other components) are mixed together either with or without a diluent to form the reaction mixture. In one embodiment, the reactive mixture comprises less than about twenty percent (e.g., such as less than about ten percent, less than about five percent, or less than about one percent) by weight, of one or more diluents, or comprises no diluents.

In one embodiment where a diluent is used, the diluent has a polarity sufficiently low to solubilize the non-polar components in the reactive mixture at reaction conditions. One way to characterize the polarity of the diluents of the present invention is via the Hansen solubility parameter, δp. In certain embodiments, the δp is less than about 10, and preferably less than about 6. Suitable diluents are further disclosed in US Patent Application No. 20100280146 and U.S. Pat. No. 6,020,445.

In another embodiment the selected diluents are ophthalmically compatible, at least in small concentrations. Thus, in one embodiment the diluent is ophthalmically compatible in concentrations of up to 5 weight % in the packing solution and in some embodiments, up to 1% by weight of the packing solution.

Classes of suitable diluents include, without limitation, alcohols having 2 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In one embodiment, the diluents are selected from 1,2-octanediol, t-amyl alcohol, 3-methyl-3-pentanol, decanoic acid, 3,7-dimethyl-3-octanol, tripropylene glycol methyl ether (TPME),1,2-propanediol, glycerol, polyethylene glycol having molecular weights between about 200 and about 30,000, methyl glucose ethers, such as Glucam polymers, butoxyethyl acetate, mixtures thereof and the like.

In one embodiment, the diluents are selected from diluents that have some degree of solubility in water. In some embodiments at least about three percent of the diluent is miscible water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like.

Suitable ranges for the components of the present invention are shown in the Table below.

| Component | Concentration (wt %) |
|---|---|
| Silicone component | 10-87, 10-80, 20-70 |
| PEG | 3-30 |
| Hydrophilic component | 5-40, 10-40, 13-40, 13-30 |
| Wetting agent | 0-50; 5-40, 6-40, 10-20 |
| Other | 0-20 |
| Diluent | ≤20, <15, ≤10, ≤5, ≤1, 0 |

It will be appreciated that the amount of the components in each embodiment will add up to 100. Also, the ranges may be combined in any combination.

Curing of Silicone Polymer/Hydrogel and Manufacture of Lens

The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, to thereby produce a polymer in the approximate shape of the final desired product.

In one embodiment, the lenses are released, or deblocked from the mold dry. Dry release or deblocking is achieved without contacting the lenses with a fluid or liquid. Suitable methods of dry release include the rapidly cooling the lens and lens mold or application of mechanical force, such as tapping, twisting, or pressing the lens mold.

In one embodiment, after curing and deblocking, the lens is subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. In one embodiment the aqueous solutions of the present invention comprise at least about 30 weight % water, in some embodiments at least about 50 weight % water, in some embodiments at least about 70% water and in others at least about 90 weight % water. Aqueous solutions may also include additional water soluble components such as release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. In one embodiment the aqueous solutions comprise less than about 10 weight %, and in others less than about 5 weight % organic solvents such as isopropyl alcohol, and in another embodiment are free from organic solvents. In these embodiments the aqueous solutions do not require special handling, such as purification, recycling or special disposal procedures.

In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Some embodiments can also include the application of physical agitation to facilitate leach and release. For example, the lens mold part to which a lens is adhered, can be vibrated or caused to move back and forth within an aqueous solution. Other embodiments may include ultrasonic waves through the aqueous solution.

In one embodiment, the lens is removed from the mold by a dry release process. In one embodiment of such a process, when then monomer mix has been cured to form a polymer the mold halves are separated by prying them apart. Typically the lens remains adhered to one surface of one mold half. That mold half is then flexed in order to force the lens to separate from the mold. Thus, the lens is removed from the mold without the use of any release solvent such as water or isopropanol. The released lens can then optionally be placed into a solvent for leaching or can be placed directly into a package containing a packaging solution such as buffered saline. Alternatively, the lens can be subjected to additional processing, such as plasma surface treatment, before it is hydrated.

The lenses may be sterilized by known means such as, but not limited to autoclaving.

Test Methods

Protein Solution:

A tear like fluid ("TLF") was used for protein uptake measurements. The TLF was made from by solubilizing the components, in the amounts listed in the Table below in phosphate saline buffer supplemented by sodium bicarbonate at 1.37 g/l.

TABLE

Tear Like Fluid (TLF) Composition

| Components | Composition (mg/ml) | Origin |
|---|---|---|
| Proteins and Glycoproteins | | |
| Lysozyme | 1.85 | Chicken egg white |
| Lactoferrin | 2.1 | Bovine colostrum |
| Gamma Globulins | 0.3 | Bovine plasma |
| Lipocalin | 1.3 | Milk lipocaline (β lactoglobulin) from bovine milk |
| Acid glycoprotein | 0.05 | Bovine plasma |
| Mucins | 0.15 | Bovine submaxillary glands |
| (Albumin, Fn[1], Vn[2] and others components present in tears at very low concentrations (ng) | 0.1% | Bovine serum |

TABLE-continued

Tear Like Fluid (TLF) Composition

| Components | Composition (mg/ml) | Origin |
|---|---|---|
| Lipids | | |
| Cholesteryl linoleate | 0.024 | |
| Linalyl acetate | 0.021 | |
| Triolein | 0.016 | |
| Oleic acid | 0.012 | |
| Undecylenic acid | 0.0032 | |
| Cholesterol | 0.0016 | |
| Glucose | 0.1 | |

[1]Fn: Fibronectin
[2]Vn: Vitronectin

Lipocalin uptake was measured as follows. The lipocalin solution contained B Lactoglobulin (Lipocalin) from bovine milk (Sigma, L3908) solubilized at a concentration of 2 mg/ml in phosphate saline buffer supplemented by Sodium bicarbonate at 1.37 g/l and D-Glucose at 0.1 g/l. Three lenses for each sample were tested using each protein solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were sealed using parafilm to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples known to uptake a level of lysozyme lower than 100 μg per lens were diluted 5 times. Samples known to uptake levels of lysozyme higher than 500 μg per lens (such as etafilcon A lenses) are diluted 20 times.

1 ml aliquot of PBS was used for samples 9, CE2 and the balafilcon lenses, and 20 ml for etafilcon A lens. Each control lens was identically processed, except that the well plates contained PBS instead of either lysozyme or lipocalin solution.

Lysozyme and Lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density was measured using a SynergyII Microplate reader capable for reading optical density at 562 nm.

Mucin uptake was measured using the following solution and method. The mucin solution contained mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were sealed using parafilm to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a SynergyII Micro-plate reader capable for reading optical density at 562 nm.

Wettability is measured by measuring the dynamic contact angle or DCA, typically at 23±3° C. and a relative humidity of about 45±5%, with borate buffered saline, using a Wilhelmy balance. The wetting force between the lens surface and borate buffered saline is measured using a Wilhelmy microbalance while the sample strip cut from the center portion of the lens is being immersed into or pulled out of the saline at a rate of 100 microns/sec. The following equation is used $$F=\gamma p \cos\theta \text{ or } \theta=\cos^{-1}(F/\gamma p)$$

where F is the wetting force, $\gamma$ is the surface tension of the probe liquid, p is the perimeter of the sample at the meniscus and $\theta$ is the contact angle. Typically, two contact angles are obtained from a dynamic wetting experiment—advancing contact angle and receding contact angle. Advancing contact angle is obtained from the portion of the wetting experiment where the sample is being immersed into the probe liquid, and these are the values reported herein. Five lenses of each composition are measured and the average is reported.

Oxygen permeability (Dk) was determined by the polarographic method generally described in ISO 18369-4:2006, but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses with uniform thickness in the measurement area were stacked instead of using lenses of varied thickness. The L/Dk of 4 samples with significantly different thickness values are measured and plotted against the thickness. The inverse of the regressed slope is the preliminary Dk of the sample. If the preliminary Dk of the sample is less than 90 barrer, then an edge correction of (1+(5.88(CT in cm))) is applied to the preliminary L/Dk values. If the preliminary Dk of the sample is greater than 90 barrer, then an edge correction of (1+(3.56 (CT in cm))) is applied to the preliminary L/Dk values. The edge corrected L/Dk of the 4 samples are plotted against the thickness. The inverse of the regressed slope is the Dk of the sample. A curved sensor was used in place of a flat sensor. The resulting Dk value is reported in barrers.

Water Content

The water content was measured as follows: lenses to be tested are allowed to sit in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a weighing pan and weighed. The two more sets of samples are prepared and weighed as above pan is weighed three times and the average is the wet weight.

The dry weight is measured by placing the sample pans in a vacuum oven which has been preheated to 60° C. for 30 minutes. Vacuum is applied until at least 0.4 inches Hg is attained. The vacuum valve and pump are turned off and the lenses are dried for four hours. The purge valve is opened and the oven is allowed reach atmospheric pressure. The pans are removed and weighed. The water content is calculated as follows:

Wet weight = combined wet weight of pan and lenses − weight of weighing pan

Dry weight = combined dry weight of pan and lens − weight of weighing pan $$\% \text{ water content} = \frac{(\text{wet weight} - \text{dry weight})}{\text{wet weight}} \times 100$$

The average and standard deviation of the water content are calculated for the samples are reported.

Tensile modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Tensile modulus is measured at the initial linear portion of the stress/strain curve. Percent elongation is=[(Lf−Lo)/Lo]×100.

Glass transition temperature, Tg is defined as the peak (maximum) in tan δ. The glass transition Tg after the isothermal cure, the dynamic shear modulus (G'), loss modulus (G"), and tan δ were measured using DSC as a function of temperature (frequency 1.0 Hz, auto-tension mode (tension=0), parallel plate (25.0 mm diameter), and shear stress 5.0 kPa), while the cured films were heated from 55° C. to 150° C. at 1° C./min.

EXAMPLES

These examples do not limit the invention. They are meant only to suggest a method of practicing the invention. Those knowledgeable in lenses as well as other specialties may find other methods of practicing the invention. The following abbreviations are used in the examples below:

DMA N,N-dimethylacrylamide
HEMA 2-hydroxyethyl methacrylate
IRGACURE 819 bis(2,4,6-trimethylbenzoyl)-phenylphosphineoxide
Norbloc 2-(2'-hydroxy-5-methacrylyloxyethylphenyl)-2H-benzotriazole
OH-mPDMS mono-(3-methacryloxy-2-hydroxypropyloxy) propyl terminated, mono-butyl terminated polydimethylsiloxane (Mw 612 g/mole)
PVP poly(N-vinyl pyrrolidone) (K values noted)
TEGDMA tetraethyleneglycol dimethacrylate
acPDMS 1000 bis-3-acryloxy-2-hydroxypropyloxypropyl polydimethylsiloxane (MW=1000)
CGI1850 1:1 (wgt) blend of 1-hydroxycyclohexyl phenyl ketone and bis(2,6-dimethoxybenzoyl)-2,4-4-trimethylpentyl phosphine oxide
mPEG 475 polyethyleneglycol (475 MW) monomethylether monomethacrylate

Example 1

Formulations Containing mPEG 475 as Hydrophilic Component, with Various Ratios of K30 to K90

Components of the reactive monomer mixes of Table 1a were formulated in a zero diluent system. The blends were prepared in amber jars and rolled on a jar roller with periodic heating at 45° C. until complete solubilization was obtained. Reactive monomer mixes were degassed under vacuum followed by nitrogen backfill at 760 mmHg for 15 minutes. The lenses were photo-cured using the mold parts and cure conditions shown in Table 1b. Lenses were cured with quartz plates placed on top of base curves to improve edge cut and centration. Pallets with reactive monomer mixtures loaded mold parts were placed on mirrored surface for cure.

The mold parts were mechanically separated, and the lenses remained predominantly in the zeonor front curve. The lenses were released from the front curves by applying a mechanical force on the outer surface of the plastic parts (i.e., tapping lightly on the front curve using a hammer) at room temperature.

TABLE 1a

| Component | Sample 1 | Sample 2 | Sample 3 | Sample 4 |
|---|---|---|---|---|
| OH-mPDMS | 40.00 | 40.00 | 40.00 | 40.00 |
| mPEG 475 | 10.00 | 17.00 | 19.00 | 21.00 |
| HEMA | 25.25 | 20.25 | 20.25 | 20.25 |
| TEGDMA | 0.50 | 0.50 | 0.50 | 0.50 |
| Norbloc | 2.00 | 2.00 | 2.00 | 2.00 |
| PVP K90 | 10.00 | 10.00 | 10.00 | 10.00 |
| PVP K30 | 12.00 | 10.00 | 8.00 | 6.00 |
| IRGACURE 819 | 0.25 | 0.25 | 0.25 | 0.25 |

TABLE 1b

| Nitrogen Cure Box | |
|---|---|
| Oxygen Level | <0.5% |
| Visible Light Intensity (TL03) | 5-6 mW/cm² |
| Temperature | 55-60° C. |
| RRM Dose | 100 μL |
| Cure Time | 15 minutes |
| Mold Parts | |
| Front Curve | Zeonor |
| Base Curve | Polyproplyene |

The resulting "dry released" lenses were clear/non-phase separated after cure and appeared well plasticized with no evidence of physical damage. There was a noticeable level of difficulty in mechanical lens release (lens stuck to front curve), indicating a high level of plasticity or fluidity. The lenses were clear/non-phase separated in packing solution prior to autoclaving and were hazy/phase separated after autoclaving.

Example 2

Physical Properties

Water content, percent haze, modulus, and percent elongation were measured for the sterilized lenses from Sample 1. The data obtained are shown in Table 2, where a significant level of haze was observed.

TABLE 2

| | % Haze | Mechanicals | |
|---|---|---|---|
| % Water | (relative to CSI) | Modulus (psi) | % Elongation |
| 47.0 (0.2) | 152 (5) | 129.8 (6.3) | 322.1 (36.6) |

Example 3

Introduction of acPDMS 1000 for Formation of Non-Phase Separated Autoclaved Lenses The blends in Samples 3 and 4 (which previously produced phase separated lenses upon autoclaving) were reformulated with acPDMS 1000 as a component of the cross-linker system, at the expense of HEMA. These blends are shown as Samples 5 and 6 in Table 3. Blends were treated as per Example 1. In addition, lenses were fabricated, de-molded and subjected to the aqueous process as per Example 1.

TABLE 3

| Component | Sample 5 | Sample 6 | Sample 7 |
|---|---|---|---|
| OH-mPDMS | 40.00 | 40.00 | 40.00 |
| acPDMS 1000 | 2.00 | 2.00 | 2.00 |
| mPEG 475 | 21.00 | 19.00 | 0.00 |
| DMA | 0.00 | 0.00 | 19.00 |
| HEMA | 18.25 | 18.25 | 18.25 |
| TEGDMA | 0.50 | 0.50 | 0.50 |
| Norbloc | 2.00 | 2.00 | 2.00 |
| PVP K90 | 10.00 | 10.00 | 10.00 |
| PVP K30 | 6.00 | 8.00 | 8.00 |
| IRGACURE 819 | 0.25 | 0.25 | 0.25 |

The resulting lenses were clear/non-phase separated after cure. Further, lenses from Samples 5 and 6 appeared to have a high level of plasticity while lenses from Sample 7 were very brittle. There was noticeable level of difficulty in mechanical lens release (lens stuck to FC) for Samples 5 and 6. The lenses were clear/non-phase separated in packing solution prior to autoclaving and were clear/non-phase separated after autoclaving, indicating that acPDMS 1000 has a significant effect on reducing haze or phase separation.

Example 4

Physical Properties

Sterilized lenses from Samples 5-7 were submitted for physical properties testing. Percent water content, percent haze, DCA advancing angle, Dk (edge corrected), modulus, and percent elongation were measured. The data obtained are shown in Table 4, where clear/non-phase separated lenses were obtained. In addition, all lenses were very wettable and characterized by low moduli.

TABLE 4

| Sample | % Water | % Haze (relative to CSI) | DCA Advancing angle | Dk (Edge Corrected) | Modulus (psi) | % Elongation |
|---|---|---|---|---|---|---|
| 5 | 47.7 (0.0) | 15 (1) | $^a$51 (14) $^b$50 (11) $^c$48 (6) $^d$62 (12) | 75 | 130.2 (5.8) | 159.9 (32.7) |
| 6 | 47.9 (0.1) | 21 (0) | $^a$51 (7) $^b$50 (3) $^c$48 (3) $^d$51 (9) | NT | 123.4 (8.9) | 159.5 (31.2) |
| 7 | 45.5 (0.1) | NT | $^a$51 (8) | 59 | 142.7 (7.2) | 226.8 (34.0) |

$^a$Measured directly out of package
$^b$3 hrs equilibration in DCA medium
$^c$24 hrs equilibration in DCA medium
$^d$48 hrs equilibration in DCA medium

Example 5

Adjustment of mPEG 475 to DMA Ratio for Optimal Lens Release

Using Sample 6 as the base formulation, DMA was added at 3%, 6% and 9% at the expense of mPEG 475, as shown in the Samples in Table 5. The intent was to tune the visco-elastic properties in the cured lenses, using low concentrations of DMA such that the mechanical lens release from the FC was acceptable, while obtaining optimal degree of polymerization. Blends were treated as per Example 1. In addition, lenses were fabricated, de-molded and subjected to the aqueous process as per Example 1.

TABLE 5

| Component | Sample 8 | Sample 9 | Sample 10 |
|---|---|---|---|
| OH-mPDMS | 40.00 | 40.00 | 40.00 |
| acPDMS 1000 | 2.00 | 2.00 | 2.00 |
| mPEG 475 | 16.00 | 13.00 | 10.00 |
| DMA | 3.00 | 6.00 | 9.00 |
| HEMA | 18.25 | 18.25 | 18.25 |
| TEGDMA | 0.50 | 0.50 | 0.50 |
| Norbloc | 2.00 | 2.00 | 2.00 |
| PVP K90 | 10.00 | 10.00 | 10.00 |
| PVP K30 | 8.00 | 8.00 | 8.00 |
| IRGACURE 819 | 0.25 | 0.25 | 0.25 |

The resulting lenses were clear/non-phase separated after cure. There was a noticeable level of difficulty in mechanical lens release (lens stuck to FC) for Sample 8. Lenses for Samples 9 and 10 appeared to have acceptable level of plasticity and were mechanically released without difficulty.

Example 6

Physical Properties

Water content, percent haze, modulus, and percent elongation were measured for sterilized lenses from Samples 8 through 10. The data obtained are shown in Table 6.

TABLE 6

| Sample | % Water | % Haze (relative to CSI) | DCA Advancing angle | Dk | Modulus (psi) | % Elongation |
|---|---|---|---|---|---|---|
| 8 | 46.4 (0.2) | 11 (1) | 55 (6) | 75 | 152.2 (9.2) | 129.6 (33.9) |
| 9 | 47.7 (0.3) | 19 (1) | NT | NT | 157.9 (8.6) | 149.7 (26.2) |
| 10 | 47.5 (0.2) | 20 (1) | NT | 64 | 151.9 (12.6) | 164.4 (41.8) |

Example 7

Lower Modulus

Blends containing a combination of K30 and K90 and various ratios of crosslinkers (acPDMS 1000: TEGDMA) were formulated as shown in Table 7 as per Example 1. In addition, lenses were fabricated and demolded as per Example 1. The "dry released" lenses were placed directly into individual lens vials containing 3 mL packing solution and subsequently sterilized.

TABLE 7

| Component | Sample 11 | Sample 12 | Sample 13 | Sample 14 | Sample 15 | Sample 16 | Sample 17 | Sample 18 |
|---|---|---|---|---|---|---|---|---|
| OH-mPDMS | 38.00 | 38.00 | 38.00 | 38.00 | 38.00 | 38.00 | 38.00 | 38.00 |
| acPDMS 1000 | 2.00 | 2.00 | 2.00 | 2.00 | 2.00 | 2.00 | 2.00 | 2.00 |

TABLE 7-continued

| Component | Sample 11 | Sample 12 | Sample 13 | Sample 14 | Sample 15 | Sample 16 | Sample 17 | Sample 18 |
|---|---|---|---|---|---|---|---|---|
| mPEG 475 | 10.00 | 13.00 | 13.00 | 13.00 | 13.00 | 13.00 | 14.00 | 14.00 |
| DMA | 11.00 | 8.00 | 8.25 | 8.50 | 6.00 | 8.00 | 7.00 | 7.00 |
| HEMA | 18.25 | 18.25 | 18.25 | 18.25 | 18.50 | 16.75 | 16.75 | 16.75 |
| TEGDMA | 0.50 | 0.50 | 0.25 | 0.00 | 0.25 | 0.00 | 0.00 | 0.00 |
| Norbloc | 2.00 | 2.00 | 2.00 | 2.00 | 2.00 | 2.00 | 2.00 | 2.00 |
| PVP K90 | 10.00 | 10.00 | 10.00 | 10.00 | 12.00 | 12.00 | 12.00 | 10.00 |
| PVP K30 | 8.00 | 8.00 | 8.00 | 8.00 | 8.00 | 8.00 | 8.00 | 10.00 |
| IRGACURE 819 | 0.25 | 0.25 | 0.25 | 0.25 | 0.25 | 0.25 | 0.25 | 0.25 |

The resulting lenses were clear/non-phase separated after cure, appeared to have acceptable level of plasticity, and released well from FC using mechanical force.

Example 8

Physical Properties

Water content, percent haze, modulus, and percent elongation were measured for sterilized lenses from Samples 11 through 18. The data obtained are shown in Table 8, where significantly lower moduli were obtained compared to the Samples in Table 6.

TABLE 8

| Sample | % Water | % Haze (relative to CSI) | DCA Advancing angle | Dk | Modulus (psi) | % Elongation |
|---|---|---|---|---|---|---|
| 11 | 49.5 (0.2) | 10 (0) | NT | 60 | 133.9 (9.8) | 162.9 (24.7) |
| 12 | 49.5 (0.2) | 10 (1) | NT | 60 | 129.5 (7.4) | 127.7 (31.6) |
| 13 | 51.5 (0.3) | 16 (4) | NT | 63 | 113.0 (8.7) | 202.3 (27.5) |
| 14 | 52.3 (0.2) | 18 (0) | 61 (7) | 62 | 100.2 (8.7) | 204.7 (25.5) |
| 15 | 50.3 (0.2) | 9 (1) | NT | 62 | 127.4 (7.4) | 186.4 (45.4) |
| 16 | 54.5 (0.0) | 25 (1) | 51 (12) | 65 | 81.8 (4.9) | 261.9 (55.0) |
| 17 | 54.4 (0.2) | 22 (1) | 55 (11) | 63 | 83.0 (13.0) | 243.8 (42.8) |
| 18 | 54.3 (0.1) | 20 (2) | 52 (6) | 65 | 87.6 (5.1) | 258.7 (43.6) |

Example 9

PVP Release

Sterilized lenses from Samples 14 and 16 were tested for the release of PVP into packing solution (borate buffered saline solution). For each lot, 2 vials were opened and the lenses were transferred, using plastic tweezers, into a new vial containing 3 mL of fresh packing solution. The vial was capped and placed on a reciprocating shaker at medium speed and ambient conditions. After 1 hour, the lenses were transferred to new vial containing 3 mL of fresh packing solution and shaken for 2 hours. This procedure was repeated for the generation of samples at the time points shown in Table 9. The samples were analyzed for PVP by High Performance Liquid Chromatography with Electrospray Ionization Mass Spectrometry (HPLC/ESI MS).

Separation of PVP was achieved by reversed-phase chromatography using the following chromatographic conditions:

Column: Polymer Labs PLRP-S Polystyrene Di-vinyl benzene, 50×4.6 mm×5 μm, 100 A
Column Temperature: 50° C.
Injection Volume: 50 μL
Flow Rate: 1 mL/minute
Mobile Phase Eluent A: Acetonitrile with 0.1% Trifluoroacetic acid
Eluent B: Water with 0.1% Trifluoroacetic acid
Eluent C: Isopropanol with 0.1% Trifluoroacetic acid
The mobile phase gradient for analysis was as follows:

| Time (mins) | % A | % B | % C |
|---|---|---|---|
| 0.0 | 22 | 78 | 0 |
| 1.0 | 22 | 78 | 0 |
| 11.0 | 70 | 30 | 0 |
| 11.1 | 50 | 0 | 50 |
| 14.0 | 50 | 0 | 50 |
| 14.1 | 22 | 78 | 0 |
| 17 | 22 | 78 | 0 |

Detection of PVP was achieved by ESI MS with 80% source Collision Induced Dissociation (CID), with monitoring ions with a mass to charge (m/z) of 86 (PVP). The data for cumulative release of PVP from Samples 14 and 16 are shown in Table 9, where release was demonstrated for up to 24 hours.

TABLE 9

| Time (hr) | Sample 14 Cumulative Release ug/Lens | Sample 16 Cumulative Release ug/Lens |
|---|---|---|
| 1.00 | 76.02 | 18.63 |
| 2.00 | 79.11 | 21.18 |
| 4.50 | 89.29 | 32.65 |
| 6.00 | 92.93 | 36.60 |
| 8.50 | 99.10 | 45.87 |
| 12.00 | 107.84 | 57.67 |
| 24.00 | 139.17 | 100.53 |

Example 10

Optimization of mPEG 475:DMA Ratio for Desirable "Dry Release"

Blends containing a combination of K30 and K90 were formulated as shown in Table 10 as per Example 1. In addition, lenses were fabricated and "dry released" as per Example 1. The purpose of this study was to characterize the sensitivity of the cure and properties of the formulation to changes in the PEG:DMA ratio, in an attempt to optimize the properties with regards to processing.

The level of plasticity or fluidity increased with increasing levels of mPEG 475, which resulted in increasing level of difficulty with respect to mechanical release at room temperature. The highest level of difficulty was obtained with Sample 19 where about 60% of the lenses remained stuck to the zeonor front curve when the mechanical force was applied. The level of brittleness increased with increasing levels of DMA, which resulted in significant improvement in the number of lenses obtained upon applying the mechanical force to the front curve. With Sample 26, 100% of the lenses release from the front curve when the mechanical force was applied at room temperature. However, a significant number of lenses were characterized with physical defects such as cracks or factures and edge chips likely due to the high degree of brittleness. The best yields, i.e. the highest number of lenses release with minimal number of physical defects, were obtained with Samples 22, 23, and 24.

Note that all of the dry release/mechanical release studies were conducted at room temperature, and temperature has a significant impact on the visco-elastic properties of the cured lenses. Therefore, temperature may be used to influence the release behavior of lenses.

Cooling the lenses with high levels of mPEG 475 (Samples 19, 20, and 21) to below room temperature, would tend to increase the viscosity and level of brittleness in the lenses, which would likely result in significant improvements in the yields obtained upon dry release/mechanical release.

While heating the lenses with high levels of DMA (Samples 25 and 26) to above room temperature, would tend to decrease the viscosity and level of brittleness in the lenses, which would likely result in significant improvements in the physical defects and hence improve the yields obtained upon dry release/mechanical release.

TABLE 10a

| Component | Sample 19 | Sample 20 | Sample 21 | Sample 22 | Sample 23 | Sample 24 | Sample 25 | Sample 26 |
|---|---|---|---|---|---|---|---|---|
| OH-mPDMS | 40.00 | 40.00 | 40.00 | 40.00 | 40.00 | 40.00 | 40.00 | 40.00 |
| acPDMS 1000 | 2.00 | 2.00 | 2.00 | 2.00 | 2.00 | 2.00 | 2.00 | 2.00 |
| mPEG 475 | 19.00 | 18.00 | 16.00 | 13.00 | 10.00 | 6.00 | 3.00 | 0.00 |
| DMA | 0.00 | 1.00 | 3.00 | 6.00 | 9.00 | 13.00 | 16.00 | 19.00 |
| HEMA | 18.25 | 18.25 | 18.25 | 18.25 | 18.25 | 18.25 | 18.25 | 18.25 |
| TEGDMA | 0.50 | 0.50 | 0.50 | 0.50 | 0.50 | 0.50 | 0.50 | 0.50 |
| Norbloc | 2.0 | 2.0 | 2.00 | 2.00 | 2.00 | 2.00 | 2.00 | 2.00 |
| PVP K90 | 10.00 | 10.00 | 10.0 | 10.00 | 10.00 | 10.00 | 10.00 | 10.00 |
| PVP K30 | 8.00 | 8.00 | 8.0 | 8.00 | 8.00 | 8.00 | 8.00 | 8.00 |
| IRGACURE 819 | 0.25 | 0.25 | 0.25 | 0.25 | 0.25 | 0.25 | 0.25 | 0.25 |

The Tg (heating) of the lenses of Samples 19-26 was measured and the results are shown in Table 10b.

TABLE 10b

| Sample # | mPEG475 (wt %) | DMA (wt %) | $Tg_{heating}$ (C.) |
|---|---|---|---|
| 19 | 19 | 0 | 116 |
| 20 | 18 | 1 | 116 |
| 21 | 16 | 3 | 114 |
| 22 | 13 | 6 | 118 |
| 23 | 10 | 9 | 124 |
| 24 | 6 | 13 | 127 |
| 25 | 3 | 16 | 129 |
| 26 | 0 | 19 | 135 |

Example 11

Effect of Ratio of PVP K30:K90 on Lens Properties

Blends containing a combination of K30 and K90 were formulated as shown in Table 11 as per Example 1. In addition, lenses were fabricated and demolded as per Example 1. The "dry released" lenses were transferred directly into 1 mL polypropylene blister packages containing 995 μL packing solution (with 50 ppm methylcellulose) heat sealed with propylene lined aluminum foil and subsequently sterilized by autoclaving. The purpose of this study was to examine the impact of the K30:K90 ratio on the physical properties, parameters, biometrics profile and leachable monomers of the lenses.

TABLE 11

| Component | Sample 27 | Sample 28 | Sample 29 | Sample 30 |
|---|---|---|---|---|
| OH-mPDMS | 38.00 | 38.00 | 38.00 | 38.00 |
| acPDMS 1000 | 2.00 | 2.00 | 2.00 | 2.00 |
| mPEG 475 | 13.00 | 13.00 | 13.00 | 13.00 |
| DMA | 8.00 | 8.00 | 8.00 | 8.00 |
| HEMA | 16.73 | 16.73 | 16.73 | 16.73 |
| Blue HEMA | 0.02 | 0.02 | 0.02 | 0.02 |
| Norbloc | 2.00 | 2.00 | 2.00 | 2.00 |
| PVP K90 | 12.00 | 10.00 | 8.00 | 6.00 |
| PVP K30 | 8.00 | 10.00 | 12.00 | 14.00 |
| IRGACURE 819 | 0.25 | 0.25 | 0.25 | 0.25 |

Example 12

Lens Physical Properties

Lenses from Example 11 were tested for physical properties. As demonstrated for Samples 25 through 28 in Table 12, comparable lens properties were obtained for the ratios of K90:K30 examined. Percent water content, percent haze, DCA advancing angle, Dk (edge corrected), modulus, and percent elongation were measure using the methods set forth in U.S. Pat. No. 8,168,720. All the lenses were very clear and wettable with low moduli, and the overall properties of the lenses are suitable for good clinical performance. In addition, the refractive indices of the lenses were measured on five consecutive days, after the sterilized lenses were stored at room temperature for about 1 week. The data in Table 12 show that the refractive indices of all of the lenses remained essentially constant from day 1 through day 5, suggesting that the lenses have attained equilibrium very quickly.

TABLE 12

| Property | Sample 27 | Sample 28 | Sample 29 | Sample 30 |
|---|---|---|---|---|
| Water Content, % | 54.8 (0.3) | 54.4 (0.1) | 54.3 (0.1) | 53.9 (0.3) |
| Haze, % of CSI | 15 (1) | 17 (0) | 17 (0) | 18 (0) |
| Refractive Index, Day 1 | 1.4013 | 1.4026 | 1.4034 | 1.4038 |
| Refractive Index, Day 2 | 1.4016 | 1.4022 | 1.4033 | 1.4037 |
| Refractive Index, Day 3 | 1.4015 | 1.4026 | 1.4040 | 1.4045 |
| Refractive Index, Day 4 | 1.4024 | 1.4030 | 1.4033 | 1.4043 |
| Refractive Index, Day 5 | 1.4019 | 1.4033 | 1.4038 | 1.4040 |
| Sessile Drop | 74.00 (3.61) | 70.67 (7.51) | 66.33 (4.51) | 71.33 (4.16) |
| Dk (edge corr.) | 63.0 | 67.9 | 68.6 | 66.8 |
| Modulus, psi | 75.9 (6.1) | 77.7 (3.2) | 89.2 (5.9) | 71.1 (3.8) |
| Elongation, % | 187.9 (67.1) | 207.3 (66.0) | 214.5 (52.2) | 210.8 (76.7) |

The wettability of lenses were be determined using a sessile drop technique measured using KRUSS DSA-100 TM instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface on contact lens plastic moulds. The plastic mould and the lens were placed in the sessile drop instrument holder, ensuring proper central syringe alignment and that the syringe corresponds to the assigned liquid. A 3 to 4 microliters of DI water drop was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds and the contact angle was computed based on the contact angle measured between the drop image and the lens surface.

Example 13

Effect of Ratio of PVP K30:K90 on Lens Biometrics Profile

Lenses from Example 11 were tested for uptake of protein, mucin and lipocalin. Total protein uptake was measure using method described above.

The data obtained are shown in Table 13, where negligible differences were obtained. In addition, the levels obtained are consistent with lenses of good clinical performance.

TABLE 13

| Property | Sample 27 | Sample 28 | Sample 29 | Sample 30 |
|---|---|---|---|---|
| Total Protein Uptake (μg/Lens) | 7.85 (0.63) | 7.71 (0.25) | 7.75 (0.32) | 7.70 (0.40) |
| Mucin Uptake (μg/Lens) | 5.26 (0.08) | 5.26 (0.12) | 5.23 (0.02) | 5.15 (0.04) |
| Lipocalin Uptake (μg/Lens) | 3.71 (0.18) | 3.49 (0.15) | 3.75 (0.31) | 3.70 (0.40) |

Example 14

Effect of Ratio of PVP K30:K90 on Leachable Levels

Lenses from Example 11 were tested for leachable monomers by reversed-phase HPLC-UV. The data for Samples 27 through 30 are shown in Table 14, where the levels of leachable monomers were below the limit of quantization.

Ten blister packages were opened and lenses were transferred to lint-free blotting paper. Lenses were briefly blotted and transferred to a glass scintillation vial. Five (5) mL of methanol was added and the vial was sonicated at room temperature of 30 minutes. Samples were prepared in triplicate and the extracts were analyzed by HPLC-UV using the following conditions:

Column: Agilent Eclipse Plus C18, 75×4.6 mm×1.8 μm
Column Temperature: 25° C.
Injection volume: 10 μL
Flow rate: 1 mL/minute
Mobile Phase: Eluent A: Water with 0.05% o-phosphoric acid
Eluent B: Acetonitrile with 0.05% o-phosphoric acid
Eluent C: Isopropanol with 0.1% Trifluoroacetic acid The mobile phase gradient for analysis of DMA, HEMA, mPEG 475 and Norbloc was as follows:

| Time (mins) | % A | % B | % C |
|---|---|---|---|
| 0.0 | 97 | 3 | 0 |
| 4.0 | 97 | 3 | 0 |
| 20 | 0 | 100 | 0 |
| 30 | 0 | 100 | 0 |
| 31 | 97 | 3 | 0 |
| 35 | 97 | 3 | 0 |

The mobile phase gradient for analysis of OH-mPDMS was as follows:

| Time (mins) | % A | % B | % C |
|---|---|---|---|
| 0.0 | 0 | 90 | 10 |
| 5 | 0 | 90 | 10 |
| 8 | 0 | 30 | 70 |
| 11 | 0 | 30 | 70 |
| 12 | 0 | 90 | 10 |
| 17 | 0 | 90 | 10 |

The results are depicted in Table 14.

TABLE 14

| Component | Sample 27 | Sample 28 | Sample 29 | Sample 30 |
|---|---|---|---|---|
| DMA | <3 μg/g | <3 μg/g | <3 μg/g | <3 μg/g |
| HEMA | <3 μg/g | <3 μg/g | <3 μg/g | <3 μg/g |
| mPEG 475 | <78 μg/g | <78 μg/g | <78 μg/g | <78 μg/g |
| Norbloc | <3 μg/g | <3 μg/g | <3 μg/g | <3 μg/g |
| OH-mPDMS | <78 μg/g | <78 μg/g | <78 μg/g | <78 μg/g |
| (n = 4) | | | | |

It is understood that while the invention has been described in conjunction with the detailed description thereof, that the foregoing description is intended to illustrate and not limit the scope of the invention, which is defined by the scope of the appended claims. Other aspects, advantages, and modifications are within the claims.

What is claimed is:

1. A method of manufacturing a contact lens, said method comprising the steps of:
   (i) adding reactive components to form a reactive mixture, wherein said reactive components comprise (a) at least one hydroxy-containing silicone component having a weight average molecular weight from about 200 to about 15,000 g/mole and (b) at least one monofunctional polyethylene glycol having a weight average molecular weight from about 200 to about 10,000 g/mole; and less than about 15 wt % diluents;
   (ii) curing said reactive components within said mold to form said contact lens comprising a polymer having a Tg (heating) of less than about 125° C.; and
   (iii) dry removing said contact lens from said mold.

2. The method of claim 1, wherein said at least one monofunctional polyethylene glycol is a mono-ether terminated, mono-methacrylate terminated polyethylene glycol.

3. The method of claim 2, wherein said at least one at least one monofunctional polyethylene glycol is mPEG 475.

4. The method of claim 3, wherein said reactive components comprises less than five percent, by weight, of one or more diluents.

5. The method of claim 4, wherein said reactive mixture comprises about 10 to about 20 weight % (meth)acrylamide containing monomers.

6. The method of claim 4, wherein said at least one hydroxy-containing silicone component comprises mono-(3-methacryloxy-2-hydroxypropyloxy)propyl terminated, mono-butyl terminated polydialkylsiloxane.

7. A contact lens manufactured by the method of claim 6.

8. The method of claim 3, wherein said at least one hydroxy-containing silicone component comprises mono-(3-methacryloxy-2-hydroxypropyloxy)propyl terminated, mono-butyl terminated polydialkylsiloxane.

9. The method of claim 1, wherein said reactive components comprises less than five percent, by weight, of one or more diluents.

10. The method of claim 1, wherein said polymer comprises a Tg (heating) of between about 115 and about 125° C.

11. The method of claim 1, wherein said reactive mixture comprises from about 10 to about 20 weight % of at least one hydroxyalkyl containing monomer.

12. The method of claim 11, wherein said at least one hydroxy-containing silicone component comprises mono-(3-methacryloxy-2-hydroxypropyloxy)propyl terminated, mono-butyl terminated polydialkylsiloxane.

13. The method of claim 1, wherein at least one at least one hydroxy-containing silicone component is selected from compounds of Formula I:

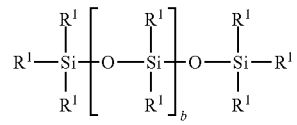

Formula I wherein:
   $R^1$ is independently selected from reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;
   where b=0 to 500, where it is understood that when b is other than 0, b is a distribution having a mode equal to a stated value; and
   wherein at least one $R^1$ comprises a hydroxy group.

14. The method of claim 1 wherein said at least one hydroxy-containing silicone component is selected from the group consisting of bis-3-acryloxy-2-hydroxypropyloxypropyl polydialkylsiloxane; and mono-(3-methacryloxy-2-hydroxypropyloxy)propyl terminated, mono-alkyl terminated polydialkylsiloxane; and mixtures thereof.

15. The method of claim 1 wherein said at least one hydroxy-containing silicone component is selected from monomethacrylate terminated polydimethylsiloxanes; bis-3-acryloxy-2-hydroxypropyloxypropyl polydialkylsiloxane; and mono-(3-methacryloxy-2-hydroxypropyloxy)propyl terminated, mono-butyl terminated polydialkylsiloxane; and mixtures thereof.

16. The method of claim 1 wherein said at least one hydroxy-containing silicone component comprises mono-(3-methacryloxy-2-hydroxypropyloxy)propyl terminated, mono-butyl terminated polydialkylsiloxane.

17. The method of claim 1, wherein said reactive components comprises DMA and the weight ratio of (i) said DMA and (ii) said at least one-monofunctional polyethylene glycol is from about 25:75 to about 75:25.

18. The method of claim 1, wherein said reactive components comprises from about 20 to about 70 percent, by weight, of said at least one monofunctional polyethylene glycol.

19. A contact lens manufactured by the method of claim 1.

20. The method of claim 1 wherein said reactive mixture further comprises at least one internal wetting agent.

21. The method of claim 20 wherein said internal wetting agent is included in said reaction mixture in an amount between about 6 and about 40 wt % based upon all components in the reaction mixture, excluding any diluents.

* * * * *